United States Patent [19]  
Sundén et al.

[11] 4,200,548  
[45] Apr. 29, 1980

[54] SILICIC ACID DETERGENT PRODUCT FOR MICRODEPOSITION OF SILICIC ACID ON TEXTILES

[75] Inventors: Olof Sundén, Lidingö; Hans Johansson, Kungälv; Håkan B. Ahlberg, Surte; Per-Arne I. Karlsson, Kållered, all of Sweden

[73] Assignee: Elektrokemiska Aktiebolaget, Surte, Sweden

[21] Appl. No.: 884,391

[22] Filed: Mar. 8, 1978

Related U.S. Application Data

[63] Continuation-in-part of Ser. No. 819,509, Jul. 26, 1977, abandoned.

[30] Foreign Application Priority Data

Aug. 2, 1976 [SE] Sweden ............................... 7608659  
Aug. 2, 1976 [SE] Sweden ............................... 7608660

[51] Int. Cl.$^2$ ............................ C11D 3/37; C11D 3/20  
[52] U.S. Cl. ............................ 252/135; 252/DIG. 15; 252/174.15; 556/446  
[58] Field of Search ............. 252/135, 89 R, DIG. 15; 260/448.2 R

[56] References Cited

U.S. PATENT DOCUMENTS

| | | | |
|---|---|---|---|
| 3,912,649 | 10/1975 | Bertorelli et al. | 252/135 |
| 3,971,727 | 7/1976 | Bertorelli et al. | 252/135 |
| 4,007,124 | 2/1977 | Collier et al. | 252/135 X |
| 4,051,054 | 9/1977 | Davies et al. | 252/89 R |

Primary Examiner—Harris A. Pitlick  
Attorney, Agent, or Firm—Wenderoth, Lind & Ponack

[57] ABSTRACT

The disclosure relates generally to the detergent art and more specifically to a silicic acid detergent product for the microdeposition of silicic acid on textiles. The product comprises essentially an adduct (hydrogen bond compound) of oligomer and/or polymer silicic acid with polyethylene oxide compounds together with alkali, $M_2O$, where M is selected from the group consisting of Na, K, Li, alkanolamines and a quaternary ammonium group, amounting to a molar ratio $SiO_2:M_2O > 4$, or preferably 6–100, said product being physically or colloidally soluble in laundry medium inside a pH of 8–12, in which medium it serves as a microdepositor for silicic acid on laundry textiles.

13 Claims, No Drawings

SILICIC ACID DETERGENT PRODUCT FOR MICRODEPOSITION OF SILICIC ACID ON TEXTILES

This application is a Continuation-in-Part of the copending application Ser. No. 819,509, filed July 26, 1977 (now abandoned), which is relied upon and the entire disclosure and specification of which is hereby incorporated by reference.

This invention relates to a group of silicic acid compounds to be used in laundering having the specific property of depositing microamounts of silicic acid on textile fibers during laundering, by which deposition process the redeposition of soil from the laundry medium to the textiles is prevented. Hence, the invention is of special importance for laundering and the treatment of polyester and cotton textiles which usually show a decreasing brightness with repeated laundering due to redeposition of soil from the laundry medium.

Thus, a basic object of the present invention is to provide a detergent component which prevents soil redeposition and progressive greying of polyester fibers and textiles of such fibers.

A further essential object of the present invention is to provide a detergent component based on silicic acid which is usable at a pH of below 10.5 in large concentrations and which functions as a builder and complexing agent such that the polyphosphate component can be reduced in the detergent composition.

It is well known that soluble alkali silicates such as sodium metasilicate and waterglasses are used as components in washing detergents. Some of their drawbacks are a very high alkalinity and the risk of massive and uncontrolled silica precipitation on textiles if the pH decreases which makes them hard, brittle and grey due to the inclusion of precipitations and soil.

The present invention refers to a new group of silicic acid complexes which does not form any dangerous precipitate, even if the pH decreases to 8, which is a very low pH for detergent compositions. Within the pH range of from 8 to 12 and preferably from 8 to 10.5 these new compounds deposit a very small amount, a microamount, of silicic acid or silicic acid compounds on fibers such as polyester and cotton. This microamount is far from dangerous to the textiles and cannot be measured as an increased ash content. It is only qualitatively detected by electron initiated X-ray emission in an electron microscope. The degree of deposition is consequently very difficult to estimate, but an increased ash content can be analyzed down to 0.01% and because this deposition is even lower it may be estimated to about 0.001% or 10 ppm of the fiber weight.

For the present discussion, this small amount of silicic acid deposition will be called "microdeposition", and the compounds responsible for this microdeposition "microdepositors". This microdeposition is highly advantageous with respect to the prevention of soil redeposition on textiles, because it induces a strong negative electrical charge to the fibers even when positive ions such as $Ca^{++}$, $Mg^{++}$ are present.

Microdepositing silicic acid compounds or "microdepositors" are adduct (hydrogen bond) compounds of oligomer and/or polymer silicic acid and ethylene oxide products with a critical and limited amount of alkali corresponding to a molar ratio $SiO_2:M_2O>4$ or preferably 6–100, in which formula $M_2O$ is $Na_2O$, $K_2O$, $Li_2O$ or the corresponding "oxide" of quaternary ammonium compounds. It should be emphasized that this small content of alkali is not sufficient to give a water soluble silicate such as waterglass. The highest commercial ratio in products available on the market is about $SiO_2:M_2O>3.5$, and ratios above that limit mostly, give gels which are difficult to handle. For solubilities of ratios above 4 specific silica structures are required.

The ethylene oxide products used for production of the adduct (hydrogen bond) silicic acid compounds can be the simple polyethylene glycols, and preferably those with 10–100 ethylene oxide units in the molecule. From the economic point of view, it is advantageous to use polyethylene oxide products which are of great value per se in laundering, for instance the nonionic tensides achieved by reacting nonyl phenols, fatty alcohols, fatty amines (saturated and unsaturated) etc. with ethylene oxide. For this special purpose tenside products with up to 30 ethylene oxide units can be used and 10–20 units in the molecule are to be preferred, due to the solubility properties of the silicic acid adduct.

The molar ratio of $SiO_2$:—$CH_2CH_2O$— is not very critical for the function of the product as "microdepositor" of silicic acid but it is important for the efficient use of the silicic component. The ratio $SiO_2$:—$CH_2CH_2O$— can be 1 and higher but preferably between 1.5–50. At the higher ratios some silicic acid will remain as solid particles or suspended particles in the laundry medium, but will not precipitate or attach to the textile material in case the silicic acid is of specific gel type, preferred here and described below.

It is known that hydrogen bond adducts (complexes) between soluble silicic acid (oligomers) and polyethylene oxide products occur on the acidic side. Hence a solution of acidic oligomer silicic acid gives a precipitation of a hydrogen bond complex with soluble polyethylene oxide compounds. The new interesting discovery is that these hydrogen bond complexes also form specific complexes on the alkaline side, which have remarkable solubility properties in spite of a low alkali content, quite different from those of only silicic acid or only polyethylene oxide compound, especially in the pH range of 8–10.5. Below pH 8 they precipitate as a homogeneous compound, which can be redissolved, if the pH is increased to 8. Above pH 12 the compounds rapidly disintegrate to common soluble silicates and polyethylene oxide compounds. Between pH 10.5 and 12, this disintegration proceeds more slowly, for which reason laundering can be performed up to a pH of 11.0–11.5 with some retained microdeposition of silicic acid on the textile material.

The most important step in producing a silicic depositor compound is the preparation of the silicic acid component itself. Even if soluble silicates such as waterglass are the raw materials for the desired silicic acid component, it is hardly possible to synthetize the depositor direct from soluble silicates, especially not when a dry detergent is required by the market. The best way is to start from a solid but active silicic acid polymer. Some precipitated silica trade marks can be used as well as pyrogenic silica (from silicium tetra chloride) but the final product achieved is inferior compared with the product achieved with a solid silica gel having a BET-surface of at least 200 $m^2/g$. Such a solid silica gel can be polycondensated and precipitated preferably in the presence of the polyethylene oxide component from a solution of oligomer silicic acid at a pH below 9 and preferably below 6 and even down to 2–4.

The BET-surface achieved on the silica gel depends very much on the pH under the precipitation (and polycondensation stage) which is indicated in the following table:

| pH | BET-surface m²/g |
| --- | --- |
| 9 | 200 |
| 8 | 275 |
| 6 | 350 |
| 4 | 425 |
| 3 | 500 |
| 2 | 700 |

The solid silicic acid component can be polycondensated and precipitated in the presence of the polyethylene oxide compound or this can be added later for instance in connection with the alkalization process.

Suitable steps of production performed in the presence of water and at a temperature of between 0° and 100° C. are the following:

1. Waterglass is rapidly acidified on being poured into sulphuric acid to form soluble oligomer silicic acid.

2a. When the mixture has reached a pH of 2-3 the polyethylene oxide component is added, which will cause the formation of a second liquid phase which solidifies during the polycondensation process to a compound gel comprising polysilicic acid and the polyethylene oxide compound. Polycondensation may be performed in connection with spray-drying.

2b. The soluble oligomer silicic acid can also be polycondensated alone without the polyethylene oxide component, but it is then more necessary to increase the pH and the temperature to increase the rate of polycondensation. The solid gel has to be processed to a slurry and then the polyethylene oxide component should be added.

2c. To the soluble oligomer silicic acid may also be added a soluble Al-sulfate or other Al-salt in order to incorporate $Al_2O_3$ in the depositor product, which seems to increase its efficiency. The product is prepared by polycondensation of a soluble acidic polymeric silicic acid in the presence of soluble aluminium salt at a pH of below 3, increasing the pH to between 4 and 9 and optionally also increasing the temperature to 60° to 100° C. The ratio $SiO_2:Al_2O_3$ should be above 2 and preferably between 4 and 40. Also in this case the polyethylene oxide component can be added before or after solidification.

3. The intermediate product can, if desired, be washed free of the sodium sulfate formed, and it should be dried to a water content of about 5-20%.

4. The final step, the alkalization, can be performed by grinding the intermediate product with sodium hydroxide, metasilicate or waterglass or any other strongly alkaline salt of weak acids e.g. perborates and borates at the alkali ratio specified. It is important that some moisture be present during this alkalization step. The alkalization process can preferably be performed simultaneously with the final compounding of the detergent composition utilizing the strong alkalinity of other composition ingredients like perborate, borate and trisodiumphosphate.

The use of the specific silicic acid component according to 1 and 2 above, offers the advantage that the silicic acid component can be in surplus of the other compounds, without precipitation and attaching the textile material. When other types of silica (precipitated or pyrogenic) are used the surplus of "unreacted" silica will directly attach to the textiles and increase the ash content. With increasing BET-surface and with the addition of Al-salts to the oligomer silicic acid, the ion exchange capacity of the product increases from 90 to 120 mg CaO/g product which is important when hard waters are used for laundering.

EXAMPLE 1

A solid polyethylene glycol, "Modopeg 4000" with high molecular weight was dissolved in water to a 15% solution. Standard waterglass available on the market containing about 360 g $SiO_2$ per liter was diluted to twice the volume and 200 ml of this mixture was batched, under intensive agitation and in an extremely fine jet to 100 ml 4-normal sulphuric acid. Once all of the waterglass had been consumed, the pH of the mixture was determined at 1.4. To this mixture, which thus contained about 36 g $SiO_2$ in the form of acidic oligomer silicic acid (solution) was added 100 ml of the above-disclosed Modopeg solution which thus corresponds to 15 g of high molecular weight polyethylene glycol.

Immediately after the mixture, which was carried out at from 20° to 30° C., the solution was clouded and a separate liquid phase which was heavier than the aqueous phase separated out. After agitation for 3 h, the separated liquid phase assumed a solid crystalline-like structure. This was subjected to wet milling, and after 4 h, the "crystals" were filtered off, washed and dried. The filtrate was checked such that it showed further clouding on the addition of more Modopeg solution, which showed that excess oligomer silicic acid was present.

The filtered-off deposit, dried at a temperature of at most 80° C., weighed 46 g, which corresponds to a silicic acid absorption of 31 g (slightly in excess of ½ mol) of the batched 15 g Modopeg (⅓ equivalent weight of ethylene oxide). This, like silica and carbon analysis, showed that each ethylene oxide group had absorbed 1.56 mol silicic acid ($SiO_2$). The dried powder was milled in a mortar and rapidly mixed with 17 ml 10-normal NaOH (slightly in excess of 1/6 mol). After 30 s the mixture assumed a pasty consistency, but hardened to a solid crystalline substance within 3 min. This proved to be of unrestricted storage life and was to 95% soluble in 60° C. warm water. It is possible to obtain solutions with up to 15% dry content. These have a pH of 11, whereas 1% solutions display a pH of 9.6.

In the acid addition to a 1% solution, ethoxy silicate at pH 7-8 was deposited. The deposition appeared to be total at pH 3-5. The deposition is easily filtered and easily dried. It gives a ratio C/Si which suggests that each ethoxy group binds 1.43 $SiO_2$ units.

EXAMPLE 2

The same oligomer silicic acid as in Example 1 was prepared anew and batched to a 10% solution of octadecyl alcohol, reacted with 18 mol ethylene oxide. In this case use was made of 200 ml of 10% tenside solution (20 g) together with 300 ml acidic oligomer silicic acid, containing 120 g $SiO_2$ per liter (36 g). The deposition which was first obtained was more waxy and assumed, after 2 h, a hard crystalline character. After 4 h it was filtered-off and washed. It was checked that the filtrate contained excess oligomer silicic acid. After drying, 48 g of the product was obtained. This weight, together with C/Si analysis, showed that each ethylene oxide group had reacted with 1.44 mol silicic acid.

The product which contained slightly less than ½ mol SiO$_2$, was alkalized with 15 ml 10-n NaOH. The product thus obtained was soluble to from 96 to 97% in warm water and it was possible to obtain a 12% solution thereof. In the 1% solution, the pH was 9.1. On the addition of sulphuric acid to a 1% solution, the product precipitated at pH 7.2. The deposition seemed to be finely crystalline and could easily be filtered and washed. The thus-obtained secondary deposition had a C/Si ratio corresponding to 1.56 SiO$_2$ per mol ethylene oxide.

The product which was obtained directly after the alkalization was used as a detergent component in a detergent mixture of low phosphate content. This mixture was used for washing polyester fabric 10 times. The results were striking, inasmuch as the polyester fibers did not grey in comparison with the case when washed in a washing solution which contained a corresponding detergent composition but without the ethoxy silicic acid adduct. A scanning analysis with electron initiation of the surface of the washed polyester fibers clearly showed a deposition of silica on the samples which were washed when the ethoxy silicic acid adduct was present.

EXAMPLE 3

A polysilicic acid was prepared. As starting materials, use was made of a waterglass solution consisting of equal parts of water and waterglass with a ratio SiO$_2$:Na$_2$O of 3.3. 400 parts by volume of the waterglass solution were batched in the form of fine jets to 160 parts by volume 2.5 molar sulphuric acid under intensive agitation. The thus-obtained solution of oligomer silicic acid was adjusted with NaOH to pH 2.5. This solution was then mixed with 50 parts by volume of a non-ionactive tenside which consisted of a 10% nonylphenol polyglycolether solution (16 EO). Air was then whisked into the tenside-containing solution of oligomer silicic acid by means of an extremely high-speed double agitator and the temperature was raised to 60° C., the silicic acid polycondensing to a solid gel. The thus-obtained solid gel was dried in a drumdrier at 110° C. to a residual moisture content of about 20% and was then subjected to comminution in a pinned disc mill to a particle size of from 1 to 1000 μm.

EXAMPLE 4

The same procedure is here applied as in Example 3, apart from that the solution of oligomer silicic acid, after the addition of non-ionactive tenside, was not foamed by whisking but instead introduced into a spray-dryer (Niro Atomizer). In the treatment in the spray-dryer, the solution of oligomer silicic acid was atomized and given highly voluminous form. The temperature in the air entering the spray-dryer was about 320° C. and the temperature of the exhaust air was about 130° C. Because of the high temperature prevailing in the spray-dryer, the silicic acid solution gelled and a solid, polycondensed silicic acid in voluminous pulverulent form was obtained. The particle size of the thus-obtained polysilicic acid was within the order of magnitude of from 1 to 1000 μm and no further comminution was necessary.

Thus, the use of a spray-dryer creates a simplified process in which the realization of voluminous form, polycondensation, drying and comminution take place, as it were, in the same operation. The acidic product achieved can be used directly as additive to the detergent composition provided that the required alkali is supplied together with other ingredients like strongly alkaline phosphates and perborates.

EXAMPLE 5

In order to clarify the greying effects and ash contents in the use of conventional detergents as compared with the case involving detergents containing polysilicic acid with a large BET-surface of more than 200 m$^2$/g, washing experiments were carried out with the help of a Terg-O-Tometer (a laboratory washing machine from the United States Testing Company Inc.). The greying of the wash was determined by reflexion measurement (Elrepho) before the washing experiments and after ten washes. The ash content of the wash after the wash experiments were determined in accordance with SIS 87 21 01.

The conditions in the washing experiments were as follows:

| | |
|---|---|
| Temperature: | 60° C. |
| Water hardness: | 15° dH |
| Dosage: | 5 g/l |
| Time: | 35 min |
| Speed: | 100 cycles/min |
| Amount of soiling: | 0.4 g/l air-filter dust and 1 g/l synthetic skin grease |
| Number of washes: | 10 |
| Test fabrics: | 100% cotton, bleached (WFK test fabric) 100% polyester (Terylene ®, from ICI) Polyester/cotton 65/35 ("Hot-box", commercial fabric). |
| Rinsing: | under cold running water |
| Detergent: | As the detergent base use was made of Test Detergent A according to Swedish Standard SIS 18 2410 with the following components: |
| Detergent A: | Dodecylbenzene sulphonate 100% — 5% |
| | Tallow fat alcohol, 50 EO — 5% |
| | Soap, tallow type, 100% — 4% |
| | Pentasodium triphosphate (Na$_5$P$_3$O$_{10}$) — 30% |
| | Waterglass (Na$_2$O . 3,2SiO$_2$ . 4H$_2$O) — 5% |
| | Soda, calcined (Na$_2$CO$_3$) — 5% |
| | Na-CMC, 100% — 1% |
| | Magnesium silicate (MgSiO$_3$) — 1% |
| | EDTA-Na$_4$, 100% — 0.2% |
| | Sodium sulphate, calcined, 100% — 1.7% |
| | Trisodium phosphate (Na$_3$PO$_4$ . 12H$_2$O) — 10% |
| | Sodium perborate (NaBO$_3$ . 4H$_2$O) — 25% |
| | Water and salts from dodecylbenzene sulphonate, soap, waterglass, Na-CMC and EDTA-Na$_4$ to — 100% |
| Detergent B: | as per detergent A, wherein 5% of trisodium phosphate (Na$_3$PO$_4$ . 12H$_2$O) were replaced by the product according to the present invention manufactured in Example 4. |

The results are accounted for in Table 1.

TABLE 1

| | 100% Polyester | | Polyester/Cotton 65/35 | | 100% Cotton | |
|---|---|---|---|---|---|---|
| Detergent | Greying, units greyer | Ash-content % | Greying, units greyer | Ash-content % | Greying, units greyer | Ash-content % |
| A | 41 | 1.43 | 13 | 0.80 | 14 | 0.24 |

TABLE 1-continued

| Detergent | 100% Polyester | | Polyester/Cotton 65/35 | | 100% Cotton | |
|---|---|---|---|---|---|---|
| | Greying, units greyer | Ash-content % | Greying, units greyer | Ash-content % | Greying, units greyer | Ash-content % |
| B | 26 | 0.78 | 10 | 0.61 | 16 | 0.26 |

It is apparent from Table 1 that detergent B which was based on the polysilicic acid according to the invention, resulted in a marked reduction of the greying and ash-content in the washing of polyester material. Also in the washing of mixed material of polyester/cotton, a reduced greying and ash-content were obtained, whereas the results in washing cotton material were comparable with those obtained by means of conventional detergent.

EXAMPLE 6

A commercial washing powder known as VIA, part No. 01311, was tested in relation to a washing powder containing the silicic acid product of Example 4 and with the following composition:

| | |
|---|---|
| The silicic acid product of Example 4 | 5% |
| Soda | 5% |
| Sodium sulfate | 32% |
| Non-ionic tenside | 8% |
| Tallow soap | 4% |
| Magnesium silicate | 0.5% |
| Sodium perborate | 20% |
| CMC | 0.5% |
| Sodium tripolyphosphate | 25% |
| | 100% |

The test procedure was as follows:

| | |
|---|---|
| Temperature: | 60° C. |
| Hardness of water: | 15° dH |
| Programme: | normal coloureds |
| Dosing: | 90 g per wash (15 l of water) |
| Soil loading: | one cloth piece with 2.5 ml of used engine oil |
| | one cloth piece with 2.5 ml of coffee |
| | one cloth piece with 2.5 ml of tea |
| | one cloth piece with 1 g of mustard, 1 g of ketchup, 08.2 g of synthetic skin grease and 0.18 g of air filter dust |
| Weight loading: | 2 kg of towels |
| Test fabric: | 100% polyester, gabardine with 65/35% polyester/cotton from EMPA (Eidgenossische Materialprufungs- und Versuchsanstalt) |

Results after 10 washing cycles

| Products | Polyester 100% | | Polyester/Cotton 65/35 | |
|---|---|---|---|---|
| | Greying[1] | Ash content[2] | Greying[1] | Ash content[2] |
| Commercial washing powder | 44 | 1.51% | 10 | 0.55% |
| Washing powder with the silicic acid product of Example 4 | 22 | 0.62% | 6 | 0.45% |

[1] Greying is specified in units of greyness above the initialvalue and determined by means of reflection measurement(Elrepho).
[2] As per Swedish Standard SIS 872101.

EXAMPLE 7

In order to establish the washing effect with respect to greying and ash-content in the washing of soiled textiles using conventional detergent and detergent containing polysilicic acid according to the present invention, washing experiments were carried out in a normal domestic washing machine. Greying and ash-content were determined in the manner disclosed in Example 5. The experiment conditions were as follows:

| | |
|---|---|
| Temperature: | 60° C. |
| Water hardness: | 15° dH |
| Dosage: | 100 g/wash = 15 l of water |
| Rinsing: | 4 times with 30 l of water/time |
| Amount of soiling: | 2 cloth pieces 20 × 40 cm were soiled in the washing machine at 90° C. with 3 g lamp black and 0.6 g black iron oxide. |
| | 1 cloth piece smeared with 2.5 ml used motor oil |
| | 1 cloth piece smeared with 2.5 ml coffee |
| | 1 cloth piece smeared with 2.5 ml tea |
| | 1 cloth piece smeared with 1 g mustard, 1 g ketchup as well as 1 g synthetic skin grease and air-filter dust in the ratio 9:2. |
| Number of washes: | 10 |
| Test fabrics: | 100% cotton, bleached (Testfabric International) |
| | 100% polyester (Terylene ® from ICI) |
| | Polyester/cotton 65/35 ("Hot-box", commercial fabric). |
| Detergent: | As detergent base, use was made of Test Detergent A according to Swedish Standard SIS 18 24 10 as described in Example 4. |
| Detergent A: | Test detergent A |
| Detergent E: | as per detergent A, wherein 5% of the trisodium phosphate (Na$_3$PO$_4$ · 12H$_2$O) were replaced by the product according to the present invention manufactured in Example 4. |

The results are accounted for in Table 2.

TABLE 2

| Detergent | 100% Polyester | | Polyester/Cotton 65/35 | | 100% Cotton | |
|---|---|---|---|---|---|---|
| | Greying, units greyer | Ash-content % | Greying, units greyer | Ash-content % | Greying, units greyer | Ash-content % |
| A | 22 | 1.09 | 5.4 | 0.78 | 2.7 | 0.42 |
| E | 5 | 0.69 | 5.1 | 0.80 | 2.9 | 0.48 |

It is apparent from Table 2 that the detergent which contained polysilicic acid according to the present invention gave an extremely marked reduction in greying and ash-content as compared with the conventional detergent in the washing of polyester material, whereas the result in the washing of mixed material of polyester/cotton and pure cotton was comparable with that obtained with the conventional test detergent.

As was mentioned by way of introduction, the polysilisic acid according to the present invention cannot only be used as a detergent component but also as sorption agents and carriers for different subjects. Thus, the polysilicic acid according to the present invention displays a considerable capacity as a drying agent and as an absorbing agent/ion exchanger. It is of particular interest that this acid has an abnormally high absorption capacity for certain substances.

It should finally be emphasized that silicic acid depositors according to this invention may comprise physically soluble ingredients and colloidally soluble ingredients which are both efficient from the silicic acid microdeposition point of view. The presence of salts such as sodium sulfate depresses the solubility but not the microdeposition power, which may be of advantage.

Comprehensive tests have shown that polyester and cotton textiles which have been washed with these depositor compounds in the detergent formulation have shown very little loss of brightness during 20 washing cycles, while washing without these depositors shows the very well-known loss of brightness already after few washings. In all cases when brightness has been retained, the presence of Si can be detected on the fibers by electron initiated X-ray analyzing.

What we claim and desire to secure by Letters Patent is:

1. A silicic acid product to be used for laundry purposes and having the property of depositing microamounts of silicic acid on cellulose and polyester fibers of launderable textiles to thereby prevent redeposition of soil from the laundry medium onto the textile materials, said silicic acid product comprising an adduct of polymer silicic acid with a polyethylene oxide compound selected from the group consisting of polyethylene glycols and nonionic ethylene oxide tensides together with alkali of the formula $M_2O$, where M is selected from the group consisting of Na, K, Li and alkanolamines, wherein the molar ratio $SiO_2:M_2O$ is 4-100, said product being physically or colloidally soluble in laundry medium within a pH range of 8-12.

2. A silicic acid product according to claim 1 wherein the molar ratio $SiO_2:M_2O$ is 6-100.

3. A silicic acid product according to claim 1 wherein the polyethylene oxide compound consists of a polyethylene glycol with up to 100 units of ethylene oxide.

4. A silicic acid product according to claim 1 wherein the polyethylene oxide compound consists of nonionic ethylene oxide tenside, with a radical selected from the group consisting of nonylphenyl and radicals originating from a saturated or unsaturated fatty alcohol and amine, and having 1-30 ethylene oxide units in the molecule.

5. A silicic acid product according to claim 4 wherein the molecule comprises 10-20 ethylene oxide units.

6. A silicic acid product according to claim 1 wherein the polyethylene oxide compound amounts to a molecular ratio $SiO_2:-CH_2CH_2O-$ above 1.0.

7. A silicic acid product according to claim 6 wherein the polyethylene oxide compound amounts to a molecular ratio $SiO_2:-CH_2CH_2O-$ between 1.5-50.

8. A silicic acid product according to claim 1 wherein the silicic acid component also comprises aluminum oxide in an amount corresponding to a molar ratio $SiO_2:Al_2O_3$ of between 2 and 40.

9. A composition which comprises silicic acid product according to claim 1 in admixture with sodium sulfate and detergent builders.

10. In a laundry medium having a pH within the range of 8-10.5 the improvement wherein said medium contains dissolved therein a silicic acid product as defined in claim 1.

11. A process for the manufacture of a silicic acid product according to claim 1 comprising the steps A to C, said steps being carried out in the presence of water at a temperature of between 0° to 100° C.:

A preparing a solid silicic acid compound with a BET-surface area of more than 200 $m^2/g$ by polycondensation of a soluble polymer silicic acid or alkali silicate, wherein the polycondensation is effected by bringing the pH value below 9;

B reacting the resulting solid silicic acid compound after its solidification or during the polycondensation according to A with a polyethylene oxide compound selected from the group consisting of polyethylene glycol and nonionic ethylene oxide tenside to form an adduct;

C alkalizing the resulting adduct with alkali selected from the group comprising hydroxides, metasilicates, waterglass, perborates, borates, trialkaliphosphates of Na, K, Li and alkanolamine in an amount corresponding to a molar ratio $SiO_2:M_2O$ of between 6 and 100, wherein M is selected from the group consisting of Na, K, Li and alkanolamine.

12. A process according to claim 11 wherein the pH in step A is below 6.

13. A process according to claim 11 in which the silicic acid product of step A is prepared by polycondensation of a soluble acidic polymeric silicic acid in the presence of a soluble aluminum salt corresponding to a molar ratio $Si_2O:Al_2O_3$ between 2 and 40 at a pH below 3, increasing the pH to between 4 and 9 and optionally also increasing the temperature to 60° to 100° C.

* * * * *